US011550652B1

(12) United States Patent
Arora et al.

(10) Patent No.: US 11,550,652 B1
(45) Date of Patent: Jan. 10, 2023

(54) INTEGRATED REMEDIATION SYSTEM FOR NETWORK-BASED SERVICES

(71) Applicant: Amazon Technologies, Inc., Seattle, WA (US)

(72) Inventors: Siddharth Arora, Seattle, WA (US); Forest Dale Johns, Bellevue, WA (US); Tyler W. Carlton, Lynnwood, WA (US); Manas Dadarkar, Kirkland, WA (US); Subbiah Ganesan, Kirkland, WA (US); Manivannan Sundaram, Bothell, WA (US); Siva Padisetty, Bellevue, WA (US); Sandeep Gonugunta, Kirkland, WA (US); Abdou Mahmoud, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/684,099

(22) Filed: Nov. 14, 2019

(51) Int. Cl.
*G06F 11/00* (2006.01)
*G06F 11/07* (2006.01)
(Continued)

(52) U.S. Cl.
CPC ........ *G06F 11/0793* (2013.01); *G06F 11/079* (2013.01); *G06F 11/2257* (2013.01);
(Continued)

(58) Field of Classification Search
CPC ............... G06F 11/0793; G06F 11/079; G06F 11/3006; G06F 11/3082; G06F 11/3086;
(Continued)

(56) References Cited

U.S. PATENT DOCUMENTS 9,117,093 B2 * 8/2015 Gross ...................... G06F 21/78
9,548,886 B2 * 1/2017 Gates .................. G06F 11/0709
(Continued)

OTHER PUBLICATIONS

Fatema, Kaniz, Vincente. Emeakaroha, Philip D. Healy, John p. Morrison, and Theo Lynn. "A survey of cloud monitoring tools: Taxonomy, capabilities and objectives." Journal of Parallel and Distributed Computing 74, No. 10 (2014): pp. 2918-2933. (Year: 2014).*

(Continued)

*Primary Examiner* — Anthony J Amoroso
(74) *Attorney, Agent, or Firm* — Lee & Hayes, P.C.

(57) ABSTRACT

This disclosure describes automatically collecting, analyzing, and remediating operational issues with respect to systems executing within a network. For example, a service provider network may include a monitoring service may generate notifications related to operational issues upon detection of operational issues within a system executing within the service provider network. The monitoring service may provide one or more notifications related to an aggregation service that may aggregate the one or more notifications into a standardized format. Contextual information related to the operational issues may be automatically gathered by an analytics service, which may analyze the contextual information to determine a potential cause of the operational issues. Based on the potential cause, a remediation service may automatically remediate the operational issues.

20 Claims, 8 Drawing Sheets

(51) Int. Cl.
*G06F 11/34* (2006.01)
*G06F 11/30* (2006.01)
*G06F 11/22* (2006.01)

(52) U.S. Cl.
CPC ...... *G06F 11/2263* (2013.01); *G06F 11/3006* (2013.01); *G06F 11/3082* (2013.01); *G06F 11/3086* (2013.01); *G06F 11/3442* (2013.01)

(58) Field of Classification Search
CPC ............. G06F 11/3442; G06F 11/3003; G06F 11/3065; G06F 11/3072; G06F 11/2257; G06F 11/2263
See application file for complete search history.

(56) References Cited

U.S. PATENT DOCUMENTS

| | | | |
|---|---|---|---|
| 10,521,235 B1 * | 12/2019 | Balasubramanian | ........................ G06F 9/3838 |
| 10,637,737 B2 * | 4/2020 | Whitner | .............. H04L 41/0613 |
| 10,810,074 B2 * | 10/2020 | Yu | ........................ G06F 11/0766 |
| 10,841,337 B2 * | 11/2020 | Kinder | ................ H04L 63/1433 |
| 2007/0028220 A1 * | 2/2007 | Miller | ................ G05B 23/0278 717/124 |
| 2015/0358391 A1 * | 12/2015 | Moon | ..................... H04L 67/10 709/224 |
| 2019/0347148 A1 * | 11/2019 | Gomes Pereira | ...... G06K 9/623 |
| 2020/0409781 A1 * | 12/2020 | Zhen | ................... G06F 11/3006 |
| 2021/0027136 A1 * | 1/2021 | Hwang | ................ G06K 9/6217 |

OTHER PUBLICATIONS

Fatema, Kaniz, Vincent C. Emeakaroha, Philip D. Healy, John P. Morrison, and Theo Lynn. "A survey of cloud monitoring tools: Taxonomy, capabilities and objectives." Journal of Parallel and Distributed Computing 74, No. 10 (2014): pp. 2918-2933. (Year: 2014).*

* cited by examiner

INTEGRATED REMEDIATION SYSTEM FOR NETWORK-BASED SERVICES

BACKGROUND

Service providers offer cloud-based services via service provider networks to fulfill user's computing-service needs without the users having to invest in and maintain computing infrastructure required to implement the services. These service providers may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

When users operate or execute systems and/or applications within service provider networks, various types of issues may arise. These issues may generally be referred to as operational issues or operational items. Operational issues may arise with respect to the executed systems and relationships among resources used within the service provider network, interaction with third parties external to the service provider network, flaws within the systems, hardware issues, etc. Currently, in order to solve such operational issues, engineers or technicians need to manually go through various consoles and/or manuals in order to gather information, data, metrics, etc., to determine potential causes for the operational issues and then to determine potential remedial actions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
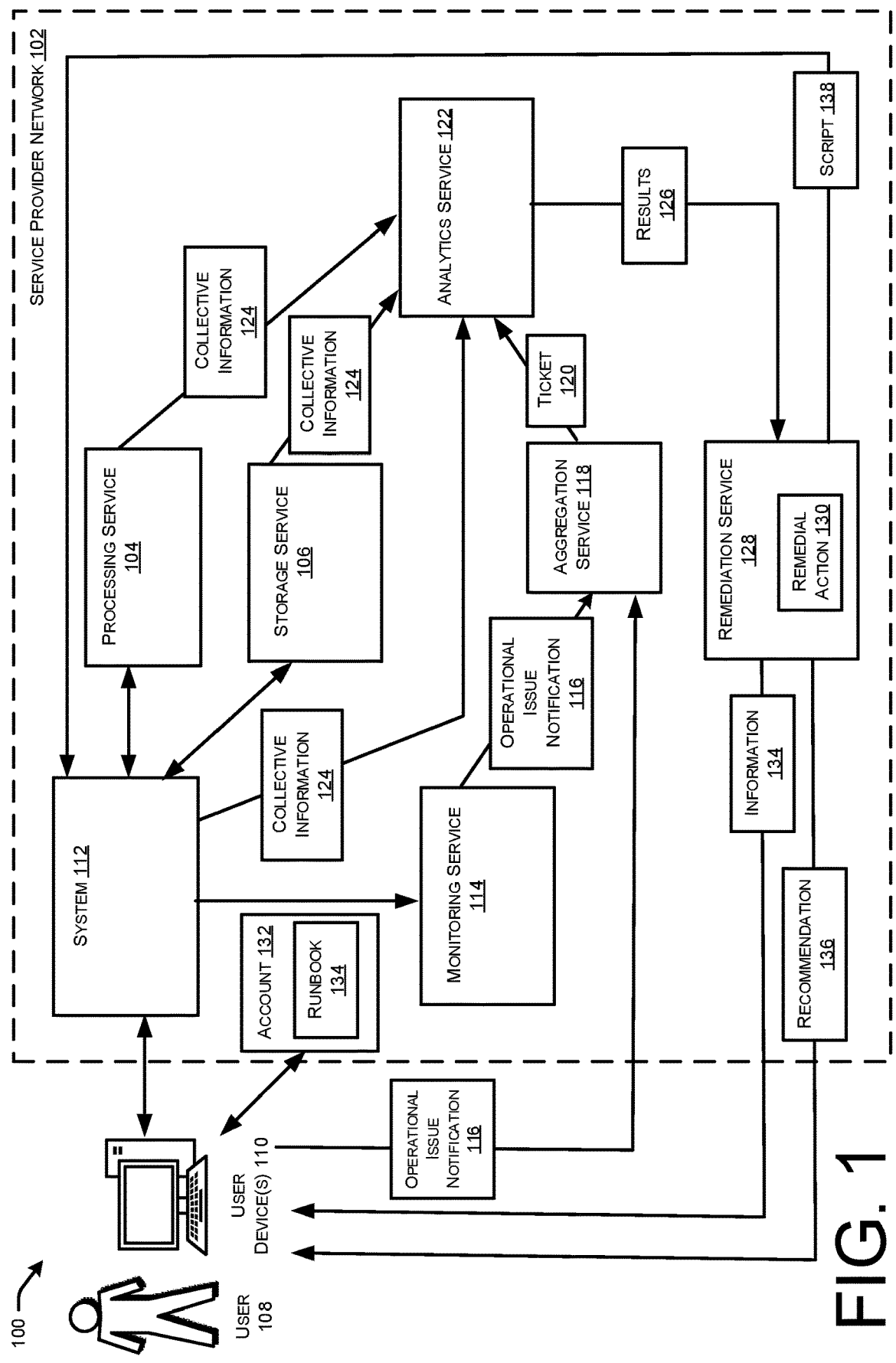
FIG. 1 schematically illustrates a system-architecture diagram of an example environment that includes an example service provider network that includes services that automatically collect, analyze, and remediate operational issues with respect to systems executing within the service provider network.

This disclosure describes, at least in part, techniques and architectures for automatically collecting information related to operational issues with respect to systems executing within a network, automatically analyzing the information, and automatically remediating the operational issues. For example, in accordance with various configurations, a service provider network may include a monitoring service that may monitor and/or gather information related to systems and/or applications executing within the service provider network. As used herein, when reference is made to a system executing within a service provider network, the use of the term "system" may also refer to applications that may be executing within a service provider network. The monitoring service may generate notifications related to operational issues upon detection of operational issues within a system executing within the service provider network. The notification is thus a red flag or ticket that indicates an operational issue that needs to be addressed, e.g., remediated.

In particular, the techniques and architecture described herein provide for the generation of one or more notifications with respect to one or more operational issues or events discovered by the monitoring service with respect to a system executing within the service provider network. In configurations, the notifications may be forwarded from the monitoring service to an aggregation service provided by the service provider network. The aggregation service may aggregate received notifications into a standardized or structured format. The aggregation service may also aggregate multiple notifications into a single notification. For example, multiple related notifications may be aggregated into a single, "parent" notification. Thus, the related individual notifications may be referred to as "children" notifications. Upon receipt of the notification, the aggregation service may provide the notifications to an analytics service provided by the service provider network.

The analytics service may gather contextual information related to the operational issue(s). For example, the analytics service may gather contextual information related to one or more of metadata related to resource usage of the system during execution within the service provider network, operational metrics related to execution of the system within the service provider network, operational logs related to execution of the system within the service provider network, resource changes related to execution of the system within the service provider network, an overall health or status of the system, relationships between the system and resources of the service provider network, security details related to execution of the system within the service provider network, etc.

The analytics service may evaluate the contextual information based upon rules and/or parameters related to execution of the system within the service provider network. The rules and parameters may relate to, for example, usage thresholds related to resource usage within the service provider network, logical relationships with respect to the system and the resources of the service provider network, interactions (e.g., communications) between the system and third parties external to the service provider network, etc. The analysis of the contextual information may provide one or more potential causes of the operational issue(s).

Based upon the analysis of the contextual information, the results may be provided to a remediation service of the service provider network. The remediation service may evaluate the results from the analytics service. Based upon the evaluation, the remediation service may determine one or more potential actions that may be performed to remediate the operational issue(s). For example, the remediation service may inform a user executing the system within the service provider network regarding potential remediation actions that the user already possesses or of which the user is already aware. For example, the user may possess a "runbook" or "playbook," e.g., that describes one or more potential remediation actions for remediating the operational issue, e.g., a remediation flow. For example, the runbook may be in the form of automation documents that may address the operational issue(s). In configurations, the runbook may specify that for operational issue A, execute operation X. However, the user may overrule the runbook and decide to execute remedial operation Y to address operational issue A.

In configurations, the remediation service may recommend to the user to follow the runbook. The recommendation may be based upon a threshold of certainty. For example, if the remediation service is ninety percent sure that the remediation flow will address the operational issue, then the remediation service may inform the user to apply the remediation flow. In configurations, the threshold of certainty may be configurable by the user and/or an operator of the service provider network. In configurations, the user may configure the remediation service, e.g., provide a user preference, such that for each instance of operational issue A, remedial operation Y is executed.

In configurations, the remediation service may inform or recommend to the user to execute a script as a remedial operation to address the operational issue. Multiple scripts may be generated by the operator of the service provider network to address various operational issues. In configurations, the user may generate one or more scripts and may share such scripts with the operator of the service provider network to share with other users who may encounter similar operational issue(s).

Since many of the same operational issues may occur among multiple systems executed by the service provider network by multiple users, the analytics service may utilize machine learning to recognize various situations and/or patterns of contextual information that occur and lead to various operational issues. Based upon the patterns recognized by analyzing the contextual information, the analytics service may quickly determine potential causes for various operational issues. Based upon the pattern recognition, the remediation service may inform and/or recommend various remedial actions that may be performed, either automatically or manually, by users executing systems within the service provider network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that includes an example service provider network 102. The service provider network 102 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 102 may be distributed across one or more physical or virtual devices.

As may be seen in FIG. 1, the service provider network 102 includes a processing service 104 and a storage service 106. As noted above, other services may be provided by the service provider network 102. A user 108, which may be an individual, a group of individuals, an entity, an organization, a business entity, etc., may obtain or purchase services via one or more user device(s) 110, e.g., electronic devices, from an operator of the service provider network 102. Thus, the user 108 may access the processing service 104 and/or the storage service 106 (as well as other services) using the one or more user devices 110. For example, the user 108 may execute a system 112 within the service provider network 102 using the one or more user devices 110. The system 112 may execute within the service provider network 102 utilizing various services, e.g., the processing service 104 and the storage service 106, as well as other services not illustrated in FIG. 1. For example, the system 112 executed by the user 108 within the service provider network 102 may involve instantiation of one or more virtual machine instances (not illustrated) via the processing service 104. The user 108 may also, via execution of the system 112, store and retrieve data via the storage service 106.

In configurations, the service provider network 102 includes a monitoring service 114 that monitors the system 112. When an operational issue or event arises with respect to execution of the system 112 that is detected by the monitoring service 114, the monitoring service 114 may generate an operational issue notification 116. For example, an operational issue may arise when a software patch failure occurs with respect to execution of the system 112. Upon detection of the software patch failure, the monitoring service 114 may generate an operational issue notification 116. In configurations, the monitoring service 114 may be a service external to the service provider network 102, e.g., the monitoring service 114 may be a service provided by a third-party.

The operational issue notification 116 may be forwarded to an aggregation service 118 provided by the service provider network 102. In configurations, when an operational issue arises, the user 108 may generate the operational issue notification 116 and provide it to the aggregation service 118. In configurations, one or more operational issues may occur at one time and, thus, multiple operational issue notifications 116 or a single notification 116 may be provided to the aggregation service 118 depending on the configuration of the monitoring service 114 and/or the aggregation service 118.

The aggregation service 118 may aggregate the operational issue notifications 116 received into a standardized or structured format or ticket 120 for a standardized console that may be based on the service provider network 102. This may allow for operational issue notifications 116 to be received from various sources and still be processed. Thus, the operational issue notification 116 is an evolving item that evolves into the ticket 120, e.g., the ticket 120 is the operational issue notification evolved into the ticket 120.

Additionally, if multiple operational issue notifications 116 are provided to the aggregation service 118 at the same time, the aggregation service 118 may aggregate the multiple operational issue notifications 116 into a single operational issue notification 116, e.g., a single ticket 120. For example, multiple related operational issue notifications 116 may be aggregated into a single, "parent" notification. Thus, the related individual issue notifications may be referred to as "children" notifications. Furthermore, subsequent children operational issue notifications that are received may be associated with a corresponding aggregated parent operational issue notification. Thus, operational issue notifications 116 may be received from various sources, e.g., the monitoring service 114, other monitoring services (e.g., external monitoring services), manually from the user 108, etc. The received operational issue notifications 116 may then be aggregated into the standardized format to initiate the process of analyzing and remediating the operational issue(s) via the ticket 120.

Additionally, in configurations, the aggregation service 118 may receive an operations issue notification 116 and may apply rules in order achieve deduplication and define parent operational issue notifications. This can help reduce noise caused by multiple alarms. Furthermore, machine learning, artificial intelligence and/or rules may be applied to help proactively determine other resources and/or services that may be affected by an issue that led to an operational issue notification 116.

The aggregation service 118 may provide the ticket 120 to an analytics service 122 provided by the service provider network 102. The analytics service 122 may gather contextual information 124 related to execution of the system 112 within the service provider network 102. The contextual information 124 may be gathered for analysis in order to determine a potential cause of the operational issue. For example, contextual information may be gathered from the processing service 104, the storage service 106, the system 112, other services (not illustrated) provided by the service provider network 102, third parties external to the service provider network, the one or more user devices 110, etc.

In configurations, the contextual information 124 may include, for example, information related to one or more of metadata related to resource usage of the system 112 during execution within the service provider network 102, operational metrics related to execution of the system 112 within the service provider network 102, operational logs related to execution of the system 112 within the service provider network 102, instance logs related to execution of the system 112 within the service provider network 102, configurations that occurred around the time of the operational issue, resource changes related to execution of the system 112 within the service provider network 102, an overall health or status of the system 112, relationships between the system 112 and resources of the service provider network 102, security details related to execution of the system 112 within the service provider network 102, timing of the operational issue, etc. In configurations, scripts may be executed to gather the contextual information 124. Additionally, in configurations, the user 108 may indicate what contextual information 124 is important for analyzing operational issues. Contextual information 124 may also be obtained by checking with various services of the service provider network 102.

The analytics service 122 may analyze the contextual information 124 based upon rules and/or parameters related to execution of the system 112 within the service provider network 102. The rules and parameters may relate to, for example, usage thresholds related to resource usage within the service provider network 102, logical relationships with respect to the system 112 and the resources of the service provider network 102, interactions (e.g., communications) between the system 112 and third parties external to the service provider network 102, etc.

Upon completion of analysis by the analytics service 122, the analytics service 122 may provide results 126 to a remediation service 128. In configurations, the results 126 may be provided to the remediation service 128 along with the ticket 120. The remediation service 128 may evaluate the results 126 to determine one or more potential remedial actions 130 that may be performed to remediate the operational issue that resulted in the operational issue ticket 116 and corresponding ticket 120. In configurations, the remediation service 128 may provide information 136 that includes one or more remedial actions 130 that may be one or more potential solutions to the operational issue. The one or more remedial actions 130 may represent a further evolution of the original issue notification 116 and corresponding ticket 120.

In configurations, an account 138 of the user 108 may include a runbook 134 that includes remedial actions, where one or more of the remedial actions may be performed as a remedial flow to correct operational issue(s). In configurations, the runbook 134 may be included at one or more user devices 110 of the user 108. Thus, in configurations, as a remedial action 130, the remediation service 128 may provide information 136 to the user 108 regarding the runbook 134 and/or remedial actions that are included within the runbook 134. For example, the runbook 134 may be in the form of automation documents that may address operational issue(s). Thus, the runbook 134 may specify that for operational issue A, execute remedial operation X. However, in configurations, the user 108 may overrule the runbook 134 and decide to execute remedial operation Y to address operational issue A. Such an overruling by the user 108 may be based on user preference, costs, timing, etc. In configurations, the user 108 may configure the remediation service 128, e.g., provide a user preference, such that for operational issue A, always execute remedial operation Y.

In configurations, the remediation service 128 may provide a recommendation 138 to the user 108 to follow or execute the runbook 134. The recommendation 138 may be based upon a threshold of certainty. For example, if the remediation service 128 is ninety percent sure that a remediation flow of the runbook 134 will address the operational issue, then the remediation service 128 may recommend that the user 108 apply the remediation flow provided by the runbook 134. Other levels of certainty may be acceptable (e.g., different percentages) and thus, ninety percent is not meant to be limiting. In configurations, the threshold of certainty may be configurable by the user 108 and/or an operator of the service provider network 102.

In configurations, the remediation service 128 may automatically remediate the operational issue. For example, the remediation service 128 may automatically execute a script 140 that addresses the operational issue with respect to execution of the system 112 within the service provider network 102. In configurations, the user 108 may specify that certain scripts 140 may be automatically performed to address operational issues.

Multiple scripts 140 may be generated by an operator of the service provider network 102 to address various operational issues. In configurations, the user 108 may generate one or more scripts 140 and may share such scripts 140 with the operator of the service provider network 102 to share with other users who may encounter similar operational issue(s) when executing systems 112 within the service provider network 102.

In configurations, a remedial action 130 may include further investigating the operational issue. For example, the analytics service 122 may not be able to determine a potential cause of the operational issue. Thus, additional contextual information 124 may need to be gathered. For example, some contextual information 124 may need to be gathered from third parties. Additionally, if a remedial action 130 is implemented and the operational issue is not resolved, then more contextual information 124 may be gathered and analyzed to determine additional possible cause(s) and potential remedial action(s) 130.

In configurations, the remedial action 130 may be to inform the user 108 that there is nothing to be done at this time. For example, the remediation service 128 and/or the analytics service 122 may determine a root cause for the issue that resulted in the generation of the operational issue notification 116. The root cause may be that a server is down and the issue will be resolved once the server is brought back online or a new server is provided by the service provider network 102. Thus, the remedial action 130 may be to inform the user 108 that there is nothing wrong with the user's system 112 and that the root cause needs to be addressed by the operator of the service provider network 102.

In configurations, the remediation service 128 may determine that the issue that resulted in the creation of the operational issue notification 116 has been remedied or fixed. The remediation service 128 may inform the originator of the operational issue notification 116 that the issue has been resolved. For example, the remediation service 128 may inform the monitoring service 114 that the issue has been resolved.

Since many of the same operational issues may occur among multiple systems 112 executed by the service provider network 102 by multiple users 108, the analytics service 122 may utilize machine learning to recognize various situations and/or patterns of contextual information 124 that occur and lead to various operational issues. Based upon the patterns recognized by analyzing the contextual information 124, the analytics service 122 may quickly determine potential causes for various operational issues. Based upon such pattern recognition, the remediation service 128 may inform and/or recommend various remedial actions 130 that may be performed, either automatically or manually, by users 108 executing systems 112 within the service provider network 102.

In configurations, the machine learning may include the analytics service 122 training and utilizing a deep learning model. The deep learning model may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Another example architecture for the deep learning model includes using random cut forest (RCF), which is an unsupervised algorithm. Other architectures and algorithms may be used for the deep learning model if desired.

In configurations, one or more of the aggregation service 118, analytics service 122 and/or remediation service 128 may be integrated as part of one service provided by the service provider network 102. Additionally, the monitoring service 114 may be part of such a single, integrated service that provides one or more of the aggregation service 118, the analytics service 122, and/or the remediation service 128. Thus, in configurations, the monitoring service 114, the aggregation service 118, the analytics service 122, and the remediation service 128 may be a single integrated service that automatically monitors and remediates systems that execute within the service provider network 102.

Figure 2:
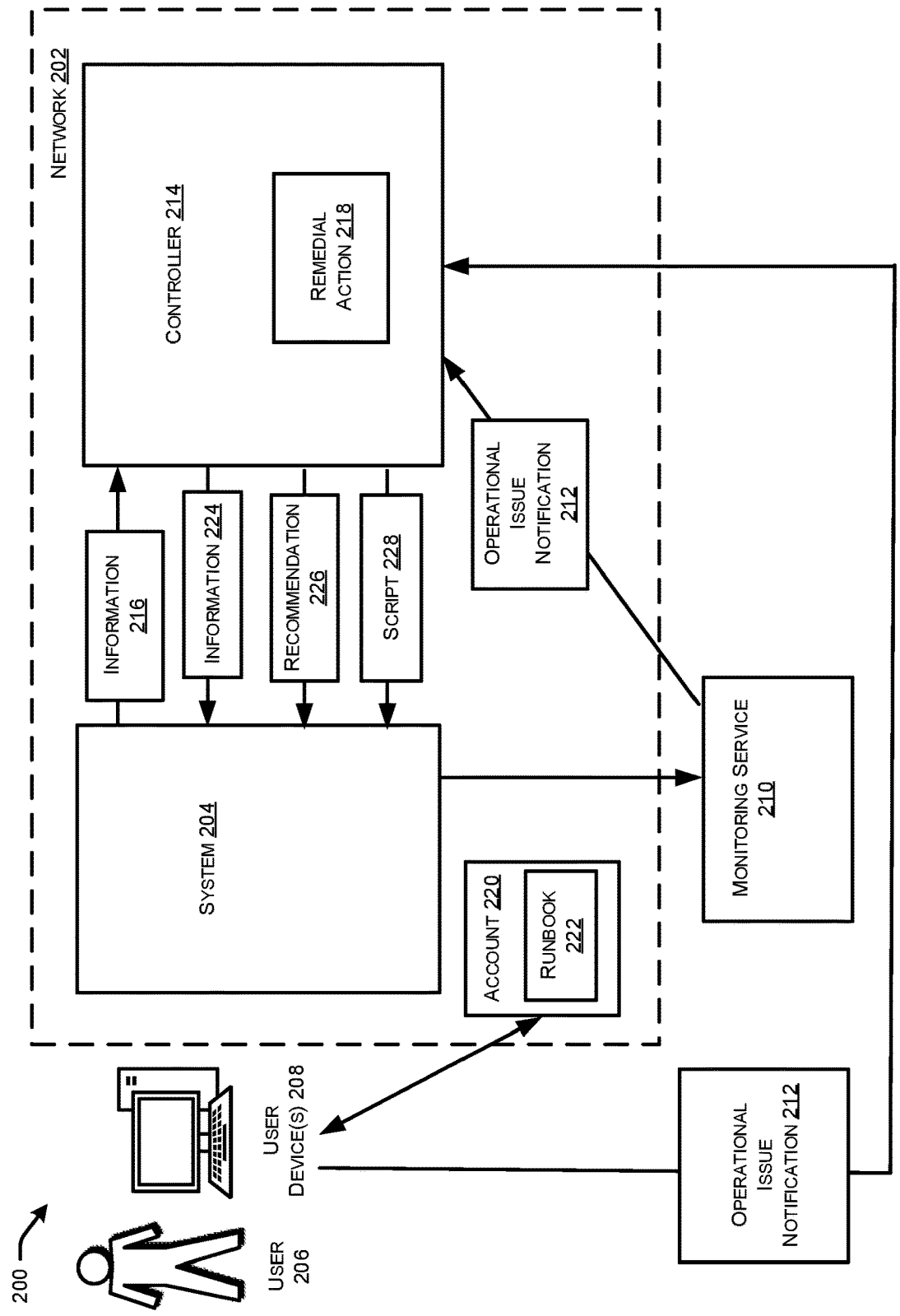
FIG. 2 schematically illustrates a system-architecture diagram of an example arrangement of a network and components that automatically collect, analyze, and remediate operational issues with respect to systems executing within the network.

FIG. 2 illustrates a system-architecture diagram of an example arrangement 200 of a network 202 within which a system 204 (which may be at least similar to system 112) may be executing. The system 204 may be executing on behalf of a user 206 on one or more user devices 208, e.g., electronic devices, that are coupled to the network 202. The user 206 may be an individual, a group of individuals, an entity, an organization, a business entity, etc. In configurations, the network 202 may be within an entity, an organization, a business entity, etc. and/or among a group of individuals, entities, organizations, business entities, and/or etc.

A monitoring service 210 may monitor execution of the system 204 in order to monitor problems that arise, e.g., operational issues, with respect to execution of the system 204. In some configurations, the monitoring service 210 may be a third-party monitoring service. In some configurations, the monitoring service 210 may be part of the network 202. The monitoring service 210 may generate operational issue notifications 212, e.g., tickets, when one or more operational issues arise. For example, an operational issue may arise when a software patch failure occurs with respect to execution of the system 204. Upon detection of the software patch failure, the monitoring service 210 may generate an operational issue notification 212.

The operational issue notifications 212 may be provided to a controller 214 of the network. In configurations, the controller 214 may aggregate the operational issue notifications 212 into a standardized format for a standardized console that may be based on the network 202. In configurations, when an operational issue arises, the user 206 may generate the operational issue notification 212 and provide it to the controller 214. In configurations, one or more operational issues may occur at one time and, thus, multiple operational issue notifications 212 or a single notification 212 may be provided to the controller 214 depending on the configuration of the monitoring service 210 and/or the controller 214.

As previously noted, the controller 214 may aggregate the operational issue notifications 212 received into a standardized or structured format. Additionally, if multiple operational issue notifications 212 are provided to the controller 214 at the same time, the controller 214 may aggregate the multiple operational issue notifications 212 into a single operational issue notification 212, e.g., a single ticket. For example, multiple related operational issue notifications 212 may be aggregated into a single, "parent" notification. Thus, the related individual issue notifications may be referred to as "children" notifications. Furthermore, subsequent children operational issue notifications that are received may be associated with a corresponding aggregated parent operational issue notification.

Additionally, in configurations, the controller 214 may receive an operations issue notification 212 and may apply rules in order achieve deduplication and define parent operational issue notifications. This can help reduce noise caused by multiple alarms. Furthermore, machine learning, artificial intelligence and/or rules may be applied to help proactively determine other resources and/or services that may be affected by an issue that led to an operational issue notification 212.

In configurations, the controller 214 may gather information 216 with respect to operation aspects of execution of the system 204 and may be gathered from sources different than the monitoring service 210. The information 216 may be gathered for analysis in order to determine a potential cause of the operational issue. In configurations, the information 216 may include, for example, information related to one or more of metadata related to resource usage of the system 204 during execution, operational metrics related to execution of the system 204, operational logs related to execution of the system 204, instance logs related to execution of the system 204, configurations that occurred around the time of the operational issue, resource changes related to execution of the system 204, an overall health or status of the system 204, relationships between the system 204 and resources within the network 202, security details related to execution of the system 204, timing of the operational issue, nodes within the network 202 with which the system 204 has interacted when the operational issue arose, etc. In configurations, scripts may be executed by the controller 214 to gather the information 216. Additionally, in configurations, the user 206 may indicate what information 216 is important for analyzing operational issues.

Upon completion of analysis by the controller 214, the controller 214 may determine one or more potential remedial actions 218 that may be performed to remediate the operational issue. For example, an account 220 of the user 206 may include a runbook 222 that includes remedial actions, where one or more of the remedial actions may be performed as a remedial flow to correct operational issue(s). In configurations, the runbook 222 may be included at one or more user devices 208 of the user 206. Thus, in configurations, as a remedial action 218, the controller 214 may provide information 224 to the user 206 regarding the runbook 222 and/or remedial actions that are included within the runbook 222. For example, the runbook 222 may be in the form of automation documents that may address operational issue(s). Thus, the runbook 222 may specify that for operational issue A, execute remedial operation X. However, in configurations, the user 206 may overrule the runbook 222 and decide to execute remedial operation Y to address operational issue A. Such an overruling by the user 206 may be based on user preference, costs, timing, etc. In configurations, the user 206 may configure the controller 214, e.g., provide a user preference, such that for operational issue A, always execute remedial operation Y.

In configurations, the controller 214 may provide a recommendation 226 to the user 206 to follow or execute the runbook 222. The recommendation 226 may be based upon a threshold of certainty. For example, if the controller is ninety percent sure that the remediation flow of the runbook 222 will address the operational issue, then the controller may recommend that the user 206 apply the remediation flow provided by the runbook 222. Other levels of certainty may be acceptable (e.g., different percentages) and thus, ninety percent is not meant to be limiting. In configurations, the threshold of certainty may be configurable by the user 206 and/or an operator of the network 202.

In configurations, the controller 214 may automatically remediate the operational issue. For example, the controller 214 may automatically execute a script 228 that addresses the operational issue with respect to the execution of the system 204. In configurations, the user 206 may specify that certain scripts 228 may be automatically performed to address operational issues.

Multiple scripts 228 may be generated by an operator of the monitoring service 210, and/or the controller 214 to address various operational issues. In configurations, the user 206 may generate one or more scripts 228 and may share such scripts with the operator of the monitoring service 210 and/or the 214 to share with other users who may encounter similar operational issue(s) when executing systems similar to system 204.

In configurations, a remedial action 218 may include further investigating the operational issue. For example, the controller 214 may not be able to determine a potential cause of the operational issue. Thus, additional information 216 may need to be gathered. For example, some information 216 may need to be gathered from third parties. Additionally, if a remedial action 218 is implemented and the operational issue is not resolved, then more information 216 may be gathered and analyzed to determine additional possible cause(s) and potential remedial action(s) 218.

In configurations, the remedial action 218 may be to inform the user 206 that there is nothing to be done at this time. For example, the controller 214 may determine a root cause for the issue that resulted in the generation of the operational issue notification 212. The root cause may be that a server is down and the issue will be resolved once the server is brought back online or a new server is provided by the network 202. Thus, the remedial action 218 may be to inform the user 206 that there is nothing wrong with the user's system 204 and that the root cause needs to be addressed by the operator of the network 202.

In configurations, the controller 214 may determine that the issue that resulted in the creation of the operational issue notification 212 has been remedied or fixed. The controller 214 may inform the originator of the operational issue notification 212 that the issue has been resolved. For example, the controller 214 may inform the monitoring service 210 that the issue has been resolved.

Since many of the same operational issues may occur among multiple systems 204 executed by networks, e.g., network 202, by multiple users 206, the controller 214 may utilize machine learning to recognize various situations and/or patterns of information 216 that occur and lead to various operational issues. Based upon the patterns recognized by analyzing the information 216, the controller 214 may quickly determine potential causes for various operational issues. Based upon such pattern recognition, the controller 214 may inform and/or recommend various remedial actions 218 that may be performed, either automatically or manually, by users 206 executing systems 204 within networks.

In configurations, the machine learning may include the analytics service 218 training and utilizing a deep learning model. The deep learning model may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Another example architecture for the deep learning model includes using random cut forest (RCF), which is an unsupervised algorithm. Other architectures and algorithms may be used for the deep learning model if desired.

In configurations, the controller 214 may be made up of one or more of an aggregation service, similar to aggregation service 118, an analytics service, similar to analytics service 122 and/or a remediation service similar to remediation service 224 that may be integrated as part of a single service. Additionally, the monitoring service 210 may be part of such a single, integrated service that provides one or more of the aggregation service, the analytics service, and/or the remediation service. Thus, in configurations, the monitoring service 210 and the controller 214 may be a single integrated entity that automatically monitors and remediates systems that execute within networks, e.g., the controller 214 may also perform the functions of the monitoring service 210.

Figure 3:
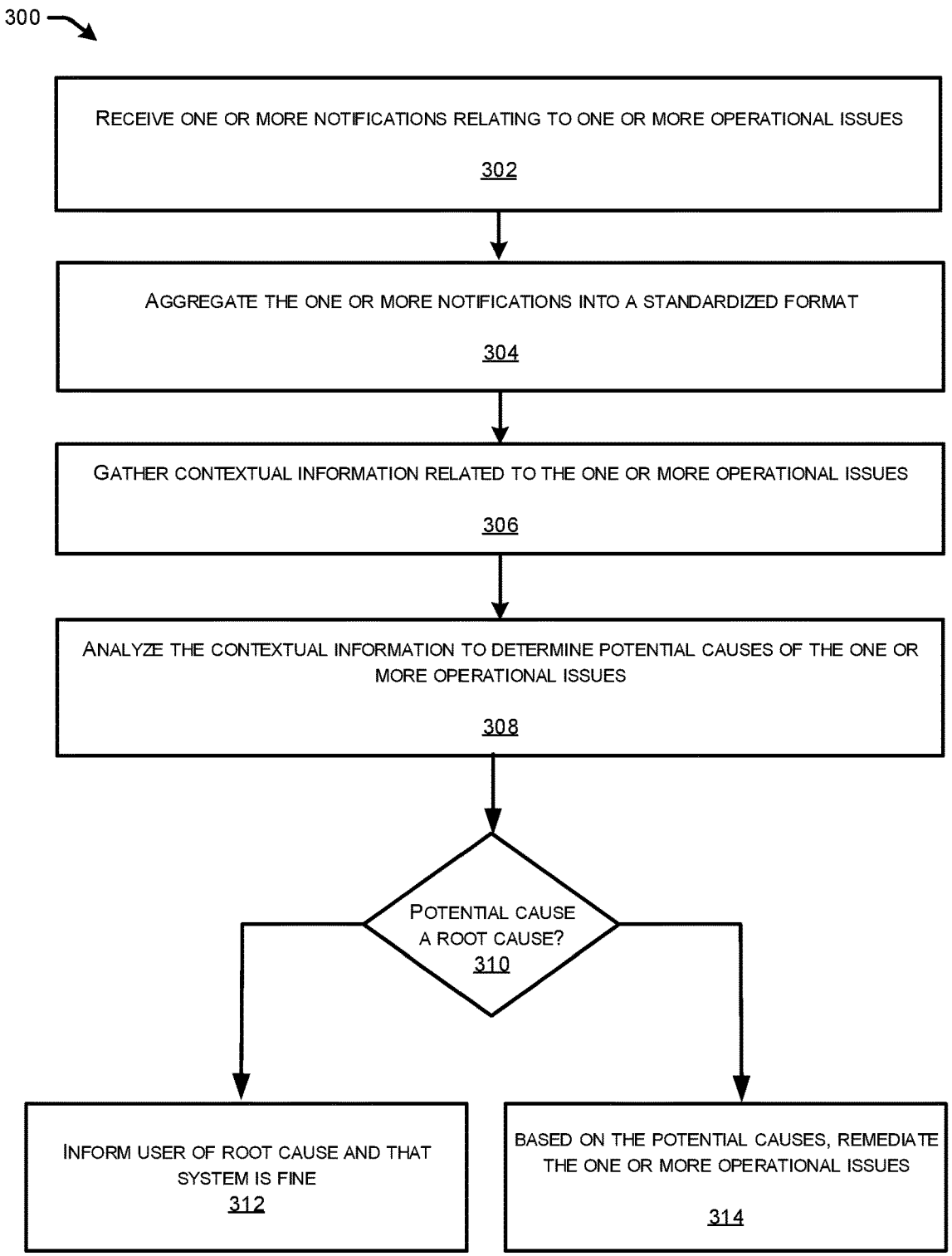
FIG. 3 illustrates a flow diagram of an example method for automatically collecting, analyzing, and remediating operational issues with respect to a system executing within a network.
Figure 4:
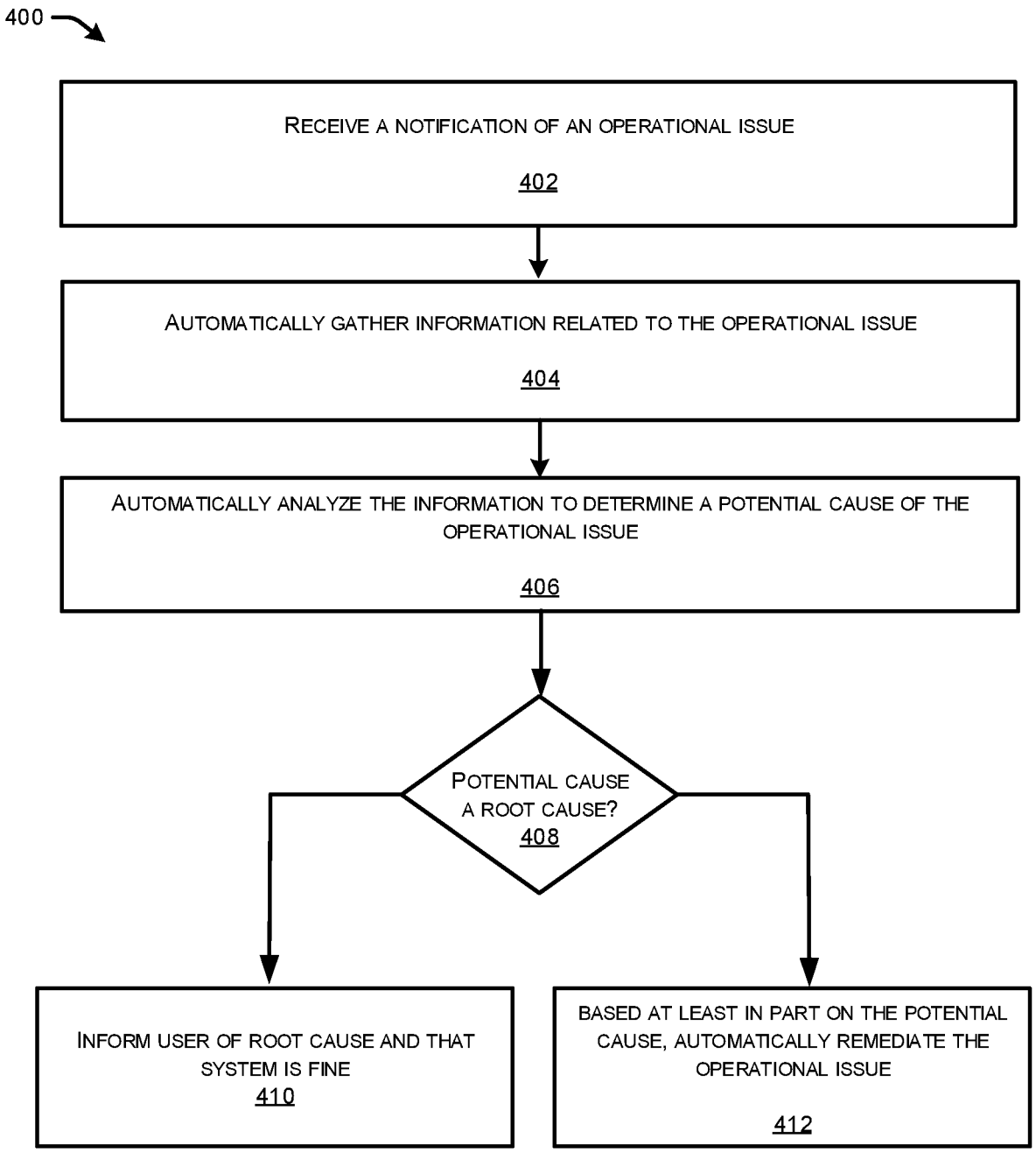
FIG. 4 illustrates another flow diagram of an example method for automatically collecting, analyzing, and remediating operational issues with respect to a system executing within a network.

FIGS. 3 and 4 illustrate flow diagrams of example methods 300 and 400 that illustrate aspects of the functions performed at least partly by the services as described in FIGS. 1 and 2. The logical operations described herein with respect to FIGS. 3 and 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of the example method 300 for automatically collecting, analyzing, and remediating operational issues with respect to a system, e.g., system 112, executing within a network, e.g., service provider network 102.

At 302, one or more notifications, e.g., operational issue notifications 116, relating to one or more operational issues are received. For example, the one or more operational issues may be received from a monitoring service, e.g., monitoring service 114, of the network. The one or more operational issues may relate to a system, e.g., system 112, executing within the network, e.g., the service provider network 102, on behalf of a user, e.g., user 108. At 304, the one or more notifications may be aggregated into a standardized format. For example, the one or more notifications may be aggregated by the aggregation service 118 of the service provider network 102 into the standardized format for a standardized console that may be based on the service provider network 102. Additionally, multiple notifications may be aggregated by the aggregation service 118 into a single notification.

At 306, contextual information, e.g., contextual information 124, may be gathered related to the one or more operational issues. For example, the analytics service 122 of the service provider network 102 may gather the contextual information. The contextual information may be gathered from sources different than the monitoring service and may comprise at least information related to execution of the system within the service provider network. At 308, the contextual information may be analyzed to determine potential causes of the one or more operational issues. For example, the analytics service 122 may evaluate or analyze the contextual information 124 to determine potential causes of the operational issues. In configurations, the analytics service 122 may determine a level of certainty with respect to potential causes of the one or more operational issues.

At 310, the method 300 determines if one of the potential causes is a root cause. For example, a remediation service, e.g., remediation service 128, and/or the analytics service 122 may determine a root cause for the issue that resulted in the generation of the notification. The root cause may be that a server is down and the issue will be resolved once the server is brought back online or a new server is provided by the service provider network. Thus, if a root cause does exist, at 312 the user may be informed that the system is fine and that the root cause is responsible for the issue.

At 314, if a root cause does not exist, based on the potential causes, the one or more operational issues may be remediated. For example, the remediation service, e.g., remediation service 128, may inform the user regarding a playbook, e.g., playbook 132, that includes one or more potential remediation actions or remediation flows that may be utilized to address the operational issue. In configurations, based on the determined level of certainty, the remediation service may recommend remedial actions. For example, the remediation service may recommend one or more remedial actions or remedial flows that may be performed to address the one or more operational issues.

FIG. 4 illustrates a flow diagram of the example method 400 for automatically collecting, analyzing, and remediating operational issues with respect to a system, e.g., system 204, executing within a network, e.g., network 202.

At 402, a notification, e.g., notification 212, of an operational issue may be received. The operational issue may relate to execution of the system 204 within the network 202, where the execution of the system utilizes computing resources on behalf of a user, e.g., user 206. In configurations, the notification may be received from a third-party monitoring service, e.g., monitoring service 210. The third-party monitoring service may be external to the network that is executing the system. For example, the network may be a service provider network such as the service provider network 102. In configurations, the monitoring service may be part of the network.

At 404, information, e.g., information 216, related to the operational issue may be automatically gathered. For example, a controller, e.g., controller 214, within the network 202 may gather various pieces of information 216 related to the operational issue, where the information is gathered from sources different than the monitoring service. For example, the information 216 may include a time at which the operational issue arose, resources being utilized by the system when the operational issue arose, interaction of the system with third party entities, and/or nodes within the network with which the system interacted when the operational issue arose, etc.

At 406, the information may be automatically analyzed to determine a potential cause of the operational issue. For example, the controller 214 of the network 202 may analyze the information 216 to determine a potential cause of the operational issue. At 408, the method 400 determines if the potential cause is a root cause. For example, the controller 214 may determine a root cause for the issue that resulted in the generation of the notification. The root cause may be that a server is down and the issue will be resolved once the server is brought back online or a new server is provided by the service provider network. Thus, if a root cause does exist, at 410 the user may be informed that the system is fine and that the root cause is responsible for the issue.

At 412, if a root cause does not exist, based on the potential cause, the operational issue may be automatically remediated. For example, the controller 214 may make recommendations to the user 206, provide information to the user 206, automatically remediate the operational issue, etc.

Accordingly, the techniques and architecture described herein allow for automatically collecting information related to operational issues with respect to systems executing within a network analyzing the information, and based on the analyzed information, remediating the operational issues. A monitoring service may generate notifications related to operational issues upon detection of operational issues within a system executing within the network. The notifications may be aggregated into a standardized format thereby allowing for notifications to be received in various formats. Contextual information related to the operational issues may be automatically gathered by an analytics service, which may analyze the contextual information to determine a potential cause of the operational issues. Based on the potential cause, a remediation service may automatically remediate the operational issues. This allows for operational issues to be addressed more quickly and efficiently without manual actions on the part of engineers and technicians. In particular, engineers or technicians do not need to manually go through various consoles and/or manuals in order to gather information, data, metrics, etc., to determine potential causes for the operational issues and then to determine potential remedial actions to address the operational issues.

Figure 5:
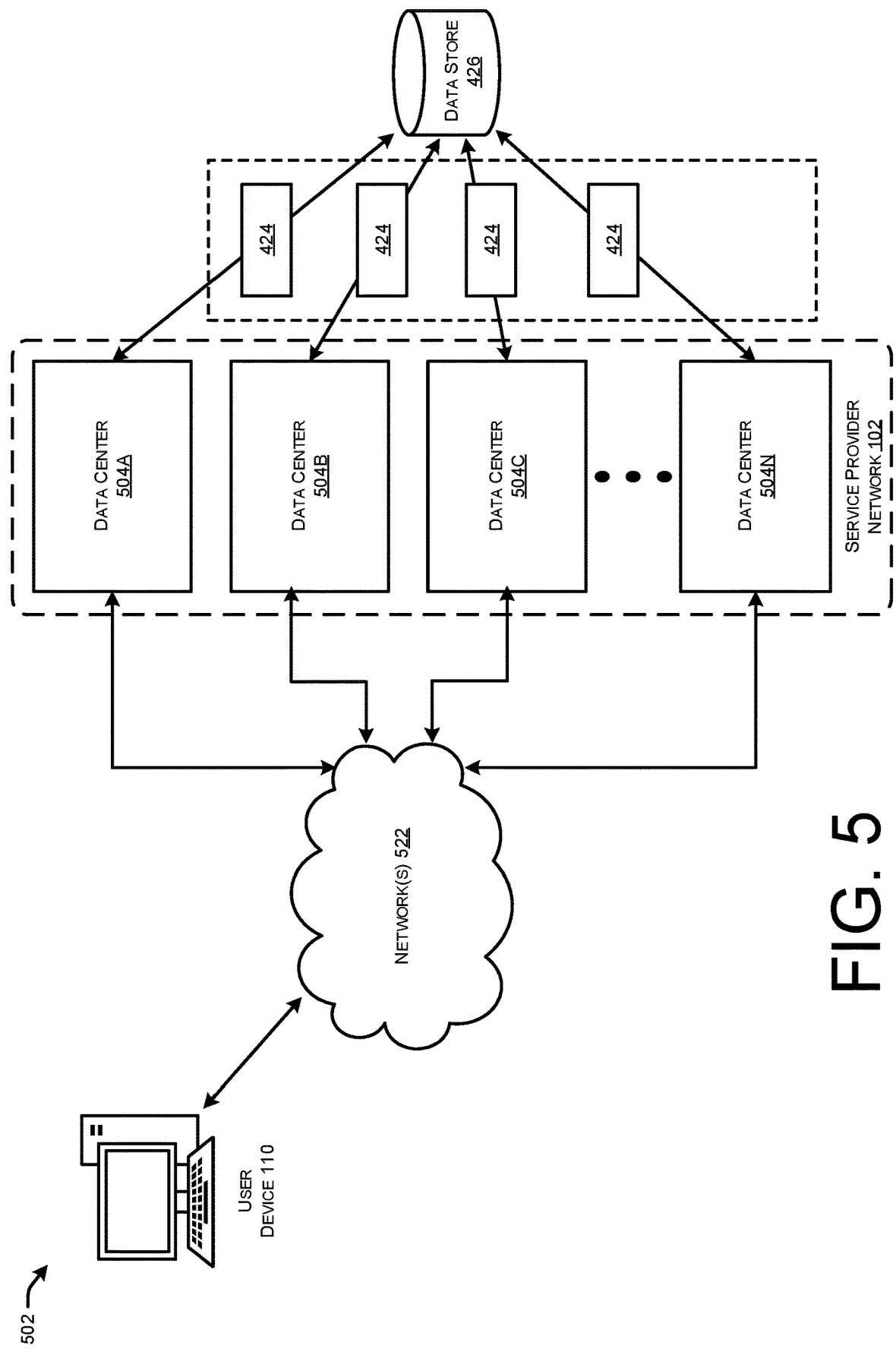
FIG. 5 is a system and network diagram that shows an illustrative operating environment that includes a service provider network that can be configured to implement aspects of the functionality described herein.

FIG. 5 is a system and network diagram that shows one illustrative operating environment 502 for the configurations disclosed herein that includes a service provider network 102 that can be configured to perform the techniques disclosed herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative embodiment for a data center 504 that can be utilized to implement the technologies disclosed herein will be described below with regard to FIG. 6.

The data centers 504 may be configured in different arrangements depending on the service provider network 102. For example, one or more data centers 504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The customers and other users 108 of the service provider network 102 may access the computing resources provided by the service provider network 102 over any wired and/or wireless network(s) 522, which can be a wide area communication network ("WAN"), such as the Internet, an intranet or an Internet service provider ("ISP") network or a combination of such networks. For example, and without limitation, a user device 110 operated by a customer or other user 108 of the cloud-based service provider network 102 may be utilized to access the service provider network 102 by way of the network(s) 522. It should be appreciated that a local-area network ("LAN"), the Internet, or any other networking topology known in the art that connects the data centers 504 to remote customers and other users can be utilized. It should also be appreciated that combinations of such networks can also be utilized.

Each of the data centers 504 may include computing devices that include software, such as applications that receive and transmit data 424. For instance, the computing devices included in the data centers 504 may include software components which transmit, retrieve, receive, or otherwise provide or obtain the data 424 from a data store 426 that may be provided by the storage service 106. For example, the data centers 504 may include or store the data store 426, which may include the data 424 that may include, for example collective information 124.

Figure 6:
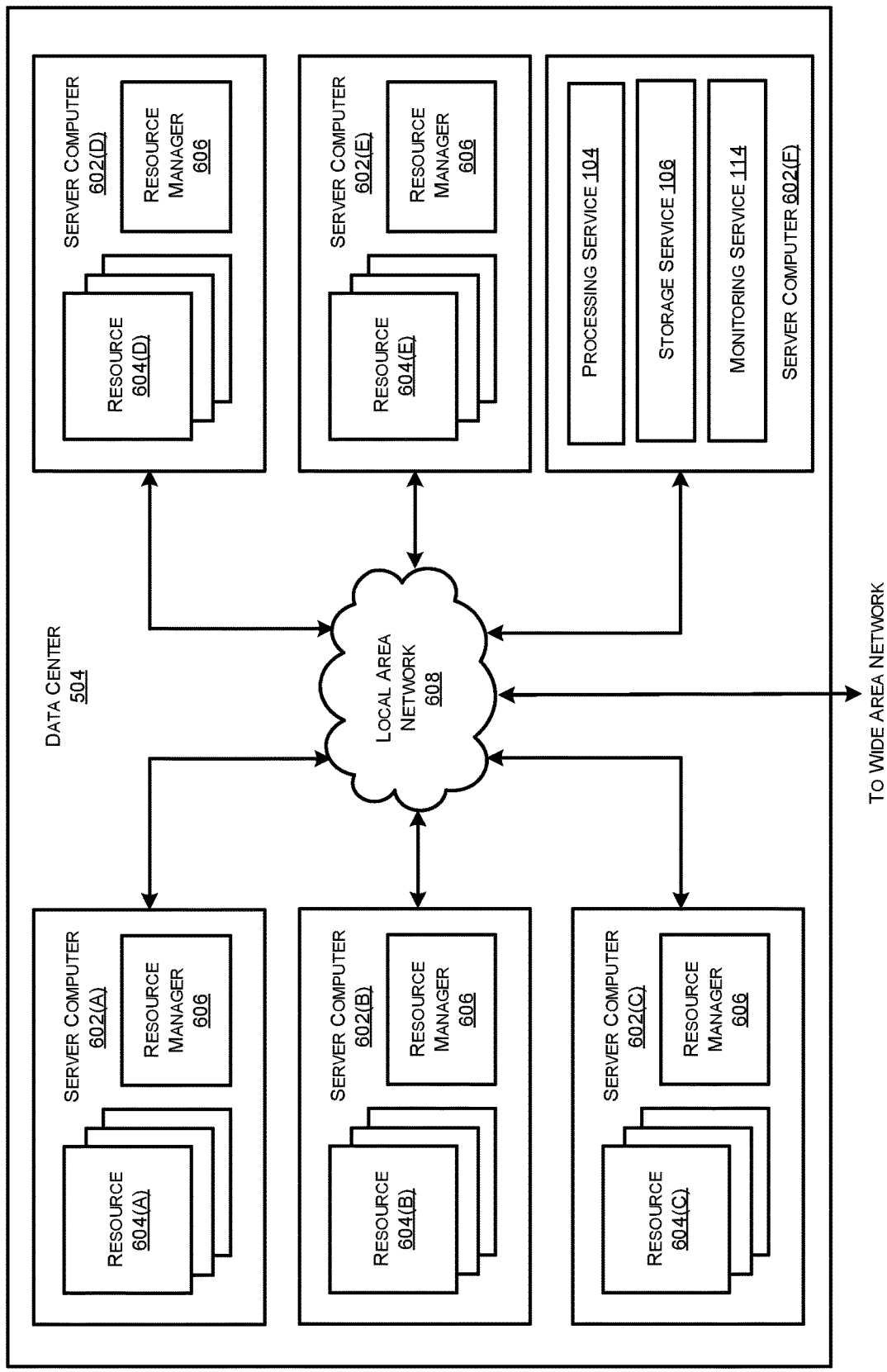
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing computing resources 604A-604E.

The server computers 602 can be standard tower, rack-mount, or blade server computers configured appropriately for providing the computing resources described herein (illustrated in FIG. 6 as the computing resources 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 6.

The data center 504 shown in FIG. 6 also includes a server computer 602F that can execute some or all of the software components described above. For example, and without limitation, the server computer 602F can be configured to execute components of the service provider network 102, including the processing service 104, the storage service 106, the monitoring service 114, and/or the other software components described above. The server computer 602F can also be configured to execute other components and/or to store data for providing some or all of the functionality described herein. In this regard, it should be appreciated that the services illustrated in FIG. 7 as executing on the server computer 602F can execute on many other physical or virtual servers in the data centers 504 in various embodiments.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
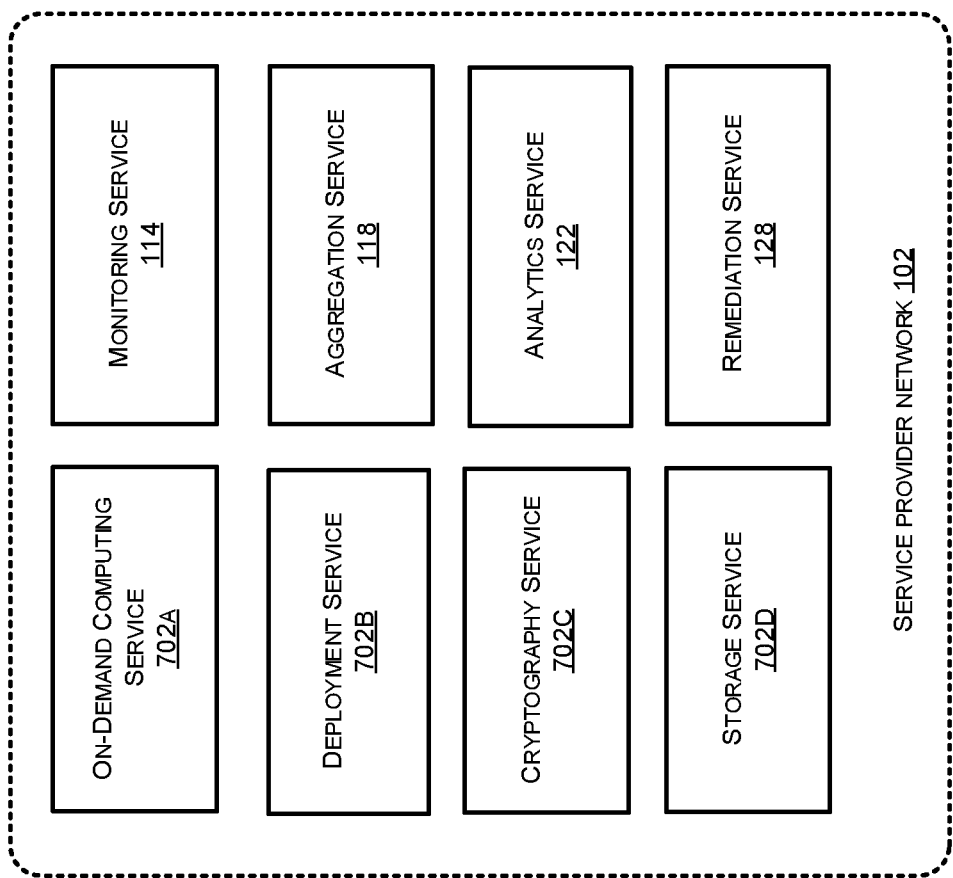
FIG. 7 is a network services diagram that shows aspects of several services that can be provided by and utilized within a system, or a larger system of which the system is a part, which is configured to implement the various technologies disclosed herein.

FIG. 7 is a system and network diagram that shows aspects of several network services that can be provided by and utilized within a service provider network 102 in one embodiment disclosed herein. In particular, and as discussed above, the service provider network 102 can provide a variety of network services to customers and other users of the service provider network 102 including, but not limited to, the monitoring service 114, the aggregation service 118, the analytics service 122, and the remediation service 128. The service provider network 102 can also provide other types of services including, but not limited to, an on-demand computing service 702A (e.g., processing service 104), a deployment service 702B, a cryptography service 702C, and an authentication service 702D, and/or a storage service 702D (e.g., storage service 106), some of which are described in greater detail below. Additionally, the service-provider network 102 can also provide other services, some of which are also described in greater detail below.

It should be appreciated that customers of the service provider network 102 can include organizations or individuals that utilize some or all of the services provided by the service provider network 102. As described herein, a customer or other user can communicate with the service provider network 102 through a network, such as the network 522 shown in FIG. 5. Communications from a customer computing device, such as the user device 110 shown in FIG. 5, to the service provider network 102 can cause the services provided by the service provider network 102 to operate in accordance with the described configurations or variations thereof.

It is noted that not all embodiments described include the services described with reference to FIG. 7 and that additional services can be provided in addition to or as an alternative to services explicitly described. Each of the services shown in FIG. 7 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 702A to store data in or retrieve data from a storage service). Additional details regarding some of the services shown in FIG. 7 will now be provided.

As discussed above, the on-demand computing service 702A (e.g., the processing service 104) can be a collection of computing resources configured to instantiate VM instances and to provide other types of computing resources on demand. For example, a customer or other user of the service provider network 102 can interact with the on-demand computing service 702A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 702A is shown in FIG. 7, any other computer system or computer system service can be utilized in the service provider network 102, such as a computer system or computer system service that does not employ virtualization and instead provisions computing resources on dedicated or shared computers/servers and/or other physical devices.

A storage service 702D (e.g., storage service 106) can include software and computing resources that collectively operate to store data using block or file-level storage devices (and/or virtualizations thereof) into data store 426, which may be part of the storage service 702D. The storage devices of the storage service 702D, e.g., storage service 106, can, for instance, be operationally attached to virtual computer systems provided by the on-demand computing service 702A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 702C. The cryptography service 702C can utilize storage services of the service provider network 102, such as the storage service 702F, to store encryption keys in encrypted form, whereby the keys are usable to decrypt customer keys accessible only to particular devices of the cryptography service 702C. The cryptography service 702C can also provide other types of functionality not specifically mentioned herein.

The service provider network 102 can additionally maintain other services 702 based, at least in part, on the needs of its customers. For instance, the service provider network 102 can maintain a deployment service 702B for deploying program code and/or a data warehouse service in some embodiments. Other services include object-level archival data storage services, database services, and services that manage, monitor, interact with, or support other services. The service provider network 102 can also be configured with other services not specifically mentioned herein in other embodiments.

Figure 8:
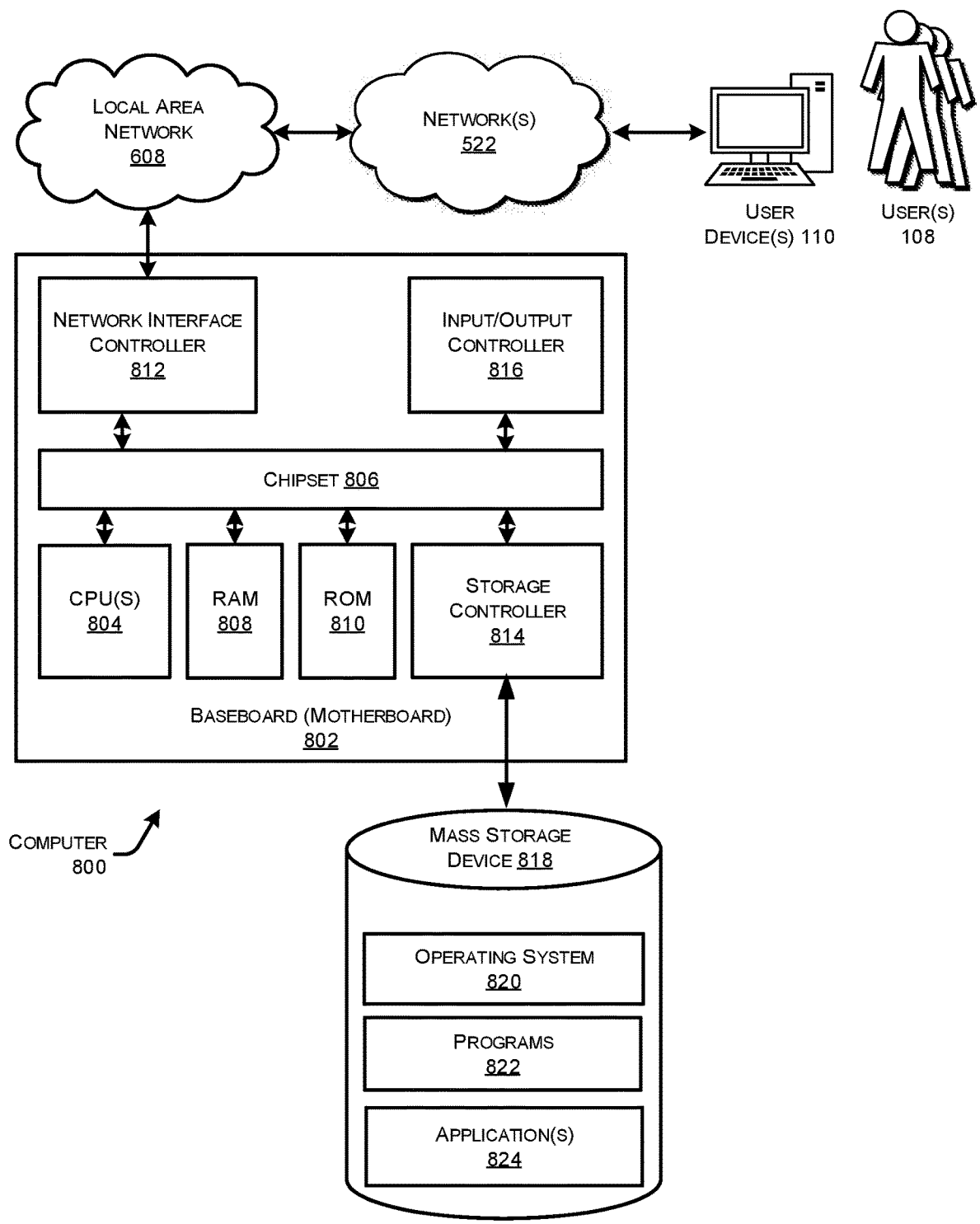
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 608. The chipset 806 can include functionality for providing network connectivity through a Network Interface Controller (NIC) 812, such as a gigabit Ethernet adapter. The NIC 812 is capable of connecting the computer 800 to other computing devices over the network 608 (or 522). It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822 (e.g., agents, etc.), data, and/or applications(s) 824, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the service provider network 102, and or any components included therein, may be supported by one or more devices similar to computer 800. Stated otherwise, some or all of the operations performed by the service provider network 102, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-4. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may transmit, receive, retrieve, or otherwise provide and/or obtain data and/or results to and/or from the service provider network 102. The computer 800 may store the data on the operating system 820, and/or the programs 22 that are stored in the mass storage device 818 to update or otherwise modify the operating system 820 and/or the programs 822.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
receiving, from a monitoring service of a service provider network, one or more notifications related to one or more operational issues, the one or more operational issues relating to a system executing within the service provider network on behalf of a user;
aggregating the one or more notifications into a standardized format;
gathering, from sources different than the monitoring service, contextual information related to the one or more operational issues, the contextual information comprising at least information related to execution of the system within the service provider network;
determining, by a machine learning model and based at least in part on the contextual information serving as first input for the machine learning model, first data that identifies a first potential cause of the one or more operational issues;
generating a trained machine learning model by training the machine learning model to identify a new pattern within the contextual information that identifies potential causes of the one or more operational issues;
determining, by the trained machine learning model and based at least in part on the new pattern serving as second input for the trained machine learning model, second data that identifies a second potential cause of the one or more operational issues, wherein the second potential cause is different from the first potential cause;
sending, via one or more first computing devices of the service provider network, at least a portion of the second data to one or more second computing devices associated with a remediation service; and
based at least in part on the second data that identifies the second potential cause, automatically remediating at least one of the one or more operational issues via the remediation service, wherein automatically remediating the at least one of the one or more operational issues includes:
identifying, via the one or more second computing devices, one or more actions to perform within the service provider network to remediate the at least one of the one or more operational issues; and
causing one or more third computing devices to execute the one or more actions to remediate the at least one of the one or more operational issues.

2. The computer-implemented method of claim 1, further comprising:
generating a recommendation based, at least in part, on the second potential cause, wherein the recommendation includes an identification of one or more action items to perform to remediate at least one of the one or more operational issues; and
transmitting the recommendation to a computing device associated with the user.

3. The computer-implemented method of claim 2, wherein generating the recommendation is based on a threshold of certainty with respect to the potential causes.

4. The computer-implemented method of claim 1, wherein automatically remediating the at least one of the one or more operational issues comprises transmitting data to a computing device of the user that informs the user of one or more potential solutions that the user already possesses.

5. The computer-implemented method of claim 1, wherein gathering contextual information related to the one or more operational issues comprises gathering one or more of (i) metadata related to resource usage of the system during execution, (ii) operational metrics related to execution of the system, (iii) operational logs related to execution of the system, (iv) resource changes related to execution of the system, (v) health of the system, (vi) relationships between the system and resources of the service provider network, or (vii) security details related to execution of the system.

6. A method comprising:
receiving a notification of an operational issue within a service provider network, the operational issue relating to execution of a system using computing resources on behalf of a user;
automatically gathering information, the information being gathered from sources different than a source of the notification, and the information being related to operational aspects of execution of the system;
determining, by a machine learning model and based at least in part on the information serving as first input for the machine learning model, a first potential cause of the operational issue;
generating a trained machine learning model by training the machine learning model to identify a new pattern within the information that identifies potential causes of the operational issue;
determining, by the trained machine learning model and based at least in part on the new pattern serving as second input for the trained machine learning model, a second potential cause of the operational issue, wherein the second potential cause is different from the first potential cause;
based at least in part on the second potential cause, automatically remediating at least a first portion of the operational issue via one or more computing devices of the service provider network, wherein automatically remediating the at least the first portion of the operational issue includes:
identifying, via the one or more computing devices, one or more actions to perform within the service provider network to remediate the operational issue; and
causing one or more other computing devices of the service provider network to execute the one or more actions to remediate the operational issue.

7. The method of claim 6, wherein receiving the notification comprises receiving the notification from a third-party monitoring service.

8. The method of claim 6, wherein:
receiving the notification comprises receiving the notification from a monitoring service provided by the service provider network.

9. The method of claim 6, further comprising:
generating a recommendation that provides an indication to perform one or more other actions to resolve at least a second portion of the operational issue; and
transmitting, to a computing device of the user, the recommendation.

10. The method of claim 9, wherein generating the recommendation is based at least in part on a threshold of certainty with respect to the second potential cause.

11. The method of claim 10, wherein the threshold is configurable by the user.

12. The method of claim 6, wherein automatically remediating at least the first portion of the operational issue comprises informing the user of one or more potential solutions that the user already possesses.

13. The method of claim 6, wherein automatically gathering the information comprises gathering one or more of (i) metadata related to resource usage of the system during execution, (ii) operational metrics related to execution of the system, (iii) operational logs related to execution of the system, (iv) resource changes related to execution of the system, (v) health of the system, (vi) relationships between the system and resources of the service provider network, or (vii) security details related to execution of the system.

14. The method of claim 6, wherein automatically analyzing the information to determine the second potential cause of the operational issue comprises determining, via a machine learning mechanism that uses a deep learning model that includes feedback connections, a pattern among the information that has been gathered.

15. The method of claim 6, wherein automatically remediating the at least the first portion of the operational issue comprises automatically applying a solution to address the operational issue, wherein the solution includes executing actions within the service provider network to remediate the operational issue.

16. One or more non-transitory computer-readable media storing computer-executable instructions that, when executed, cause one or more processors to perform operations comprising:
receiving a notification of an operational issue, the operational issue relating to execution of a system using computing resources on behalf of a user;
automatically gathering information, the information being gathered from sources different than a source of the notification, and the information being related to operational aspects of execution of the system;
determining, by a machine learning model and based at least in part on the information serving as first input for the machine learning model, a first potential cause of the operational issue;
generating a trained machine learning model by training the machine learning model to identify a new pattern within the information that identifies potential causes of the operational issue;
determining, by the trained machine learning model and based at least in part on the new pattern serving as second input for the trained machine learning model, a second potential cause of the operational issue, wherein the second potential cause is different from the first potential cause;
based at least in part on the second potential cause, automatically remediating at least a portion of the operational issue via one or more computing devices of a service provider network, wherein automatically remediating the at least the portion of the operational issues includes:
identifying, via the one or more computing devices, one or more actions to perform within the service provider network to remediate the at least the portion of the operational issue; and
causing one or more other computing devices of the service provider network to execute the one or more actions to remediate the at least the portion of the operational issue.

17. The one or more non-transitory computer-readable media of claim 16, wherein receiving the notification comprises receiving the notification from a third-party monitoring service.

18. The one or more non-transitory computer-readable media of claim 16, wherein:
the computing resources are provided by the service provider network; and receiving the notification comprises receiving the notification from a monitoring service provided by the service provider network.

19. The one or more non-transitory computer-readable media of claim 16, wherein the operations further comprise providing a computing device associated with the user a recommendation of a performance of one or more action items.

20. The one or more non-transitory computer-readable media of claim 19, wherein recommending performance of the one or more action items is based on a threshold of certainty with respect to the second potential cause, wherein the threshold is configurable by the user.

* * * * *